(12) United States Patent
Ahirwar et al.

(10) Patent No.: US 12,494,853 B2
(45) Date of Patent: Dec. 9, 2025

(54) POLAR TRANSMITTER CALIBRATION

(71) Applicant: NXP USA, Inc., Austin, TX (US)

(72) Inventors: Vijay Ahirwar, Pune (IN); Oliver Jérôme Célestin Jamin, Sainte Honorine du Fay (FR); Nilesh Nilkanth Khude, Pune (IN)

(73) Assignee: NXP USA, Inc., Austin, TX (US)

( * ) Notice: Subject to any disclaimer, the term of this patent is extended or adjusted under 35 U.S.C. 154(b) by 281 days.

(21) Appl. No.: 18/174,437

(22) Filed: Feb. 24, 2023

(65) Prior Publication Data
US 2024/0214081 A1 Jun. 27, 2024

(30) Foreign Application Priority Data
Dec. 19, 2022 (IN) .............................. 202221073461

(51) Int. Cl.
*H04B 17/14* (2015.01)
*H04B 17/19* (2015.01)
*H04B 17/21* (2015.01)

(52) U.S. Cl.
CPC ............. *H04B 17/14* (2015.01); *H04B 17/19* (2015.01); *H04B 17/21* (2015.01)

(58) Field of Classification Search
CPC ......... H04B 17/14; H04B 17/19; H04B 17/21
See application file for complete search history.

(56) References Cited

U.S. PATENT DOCUMENTS

| | | | |
|---|---|---|---|
| 9,509,355 B2 | 11/2016 | Kravitz | |
| 9,584,175 B2 | 2/2017 | Waheed | |
| 2006/0038710 A1* | 2/2006 | Staszewski | H04L 27/361 341/143 |
| 2006/0223457 A1* | 10/2006 | Rahman | H04B 1/0475 455/73 |
| 2007/0190952 A1* | 8/2007 | Waheed | H03F 1/3241 455/114.3 |
| 2010/0027689 A1* | 2/2010 | Kohlmann | H04L 27/368 375/295 |
| 2011/0292978 A1* | 12/2011 | Kravitz | H04B 1/30 375/221 |

(Continued)

FOREIGN PATENT DOCUMENTS

CN 105721386 B 7/2019

*Primary Examiner* — Junpeng Chen

(57) ABSTRACT

Polar transmitter calibration Various embodiments relate to a transmit and receive system using polar modulation, including: a transmitter configured to produce a transmit signal using modulation; a receiver configured to receive a transmit signal using in-phase/quadrature (IQ) processing; a Tx/Rx switch configured to loop a transmitted signal from the transmitter back to the receiver for calibration; and a controller configured to: command the transmitter to generate a real signal; command the Tx/Rx switch to loop the real signal back to the receiver to produce a first received signal; command the transmitter to generate an imaginary signal; command the Tx/Rx switch to loop the imaginary signal back to the receiver to produce a second received signal; determine a compensation parameter based on the first received signal and the second received signal; and command the receiver to compensate a third received signal based upon the compensation parameter.

14 Claims, 2 Drawing Sheets

(56) References Cited

U.S. PATENT DOCUMENTS

| | | | |
|---|---|---|---|
| 2012/0320957 A1* | 12/2012 | Tanaka | H04B 1/28 375/219 |
| 2016/0356439 A1 | 12/2016 | Belitzer | |
| 2020/0132810 A1* | 4/2020 | Subburaj | G01S 7/4021 |
| 2021/0377095 A1 | 12/2021 | Nayebi | |

* cited by examiner

POLAR TRANSMITTER CALIBRATION

FIELD OF THE DISCLOSURE Various exemplary embodiments disclosed herein relate generally to Rx-IQ calibration using loopback from polar transmitter.

BACKGROUND

Polar transmission is method of modulating transmit signals where the signal to be transmitted is separated into an amplitude signal and a phase signal. The phase signal may be used to control a signal oscillator. The output of the signal oscillator may then be fed into a power amplifier and the power amplifier is modulated using the amplitude signal. The use of a polar transmission may be more power efficient. Further, for some applications the linearity requirements are not as stringent as other modulation and transmission approaches, so non-linear power amplifiers may be used.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a transmit and receive system using polar modulation, including: a transmitter configured to produce a transmit signal using modulation; a receiver configured to receive a transmit signal using in-phase/quadrature (IQ) processing; a Tx/Rx switch configured to loop a transmitted signal from the transmitter back to the receiver for calibration; and a controller configured to: command the transmitter to generate a real signal; command the Tx/Rx switch to loop the real signal back to the receiver to produce a first received signal; command the transmitter to generate an imaginary signal; command the Tx/Rx switch to loop the imaginary signal back to the receiver to produce a second received signal; determine a compensation parameter based on the first received signal and the second received signal; and command the receiver to compensate a third received signal based upon the compensation parameter.

Various embodiments are described, wherein a phased-locked-loop (PLL) in the receiver produces an unmodulated I clock signal and unmodulated Q clock signal used by a Rx mixer I and Rx mixer Q in the receiver.

Various embodiments are described, wherein the real signal includes only amplitude information and no frequency modulation.

Various embodiments are described, wherein the real signal is $$\frac{(1+\cos(wt))}{2}$$

where $w=2\pi f_1$ and $f_1$ is a transmit frequency. Various embodiments are described, wherein the imaginary signal includes only amplitude information and no frequency modulation with a 90-degree phase shift.

Various embodiments are described, wherein the imaginary signal is $$\frac{(1+\cos(wt))}{2}\exp\left(\frac{i\pi}{2}\right).$$

Various embodiments are described, wherein the compensation parameter is calculated as:

$$\frac{\hat{v}}{\hat{\mu}^*} = \frac{y'_1 - y'_2}{(y'_1 + y'_2)^*},$$

where $$\frac{\hat{v}}{\hat{\mu}^*}$$

is the compensation parameter, $y'_1$ is the first received signal, $y'_2$ is the second received signal.

Various embodiments are described, wherein compensating a third received signal based upon the compensation parameter includes calculating:

$$\hat{y} = y' - \left(\frac{\hat{v}}{\hat{\mu}^*}\right)y'^*,$$

where $\hat{y}$ is a compensated third signal and $y'$ is the received third signal. Further various embodiments relate to a method of calibrating a transmit and receive system using polar modulation, including: generating a real signal; looping back the real signal back to a receiver to produce a first received signal; generating an imaginary signal; looping back the imaginary signal back to the receiver to produce a second received signal; determining a compensation parameter based on the first received signal and the second received signal; and compensating a third received signal based upon the compensation parameter.

Various embodiments are described, further including: producing an unmodulated in-phase (I) clock signal and unmodulated quadrature (Q) clock signal; and mixing the first received signal to baseband using an Rx mixer I and an Rx mixer Q in the receiver. Various embodiments are described, wherein the real signal includes only amplitude information and no frequency modulation.

Various embodiments are described, wherein the real signal is $$\frac{(1+\cos(wt))}{2}$$

where $w=2\pi f_1$ and $f_1$ is a transmit frequency.

Various embodiments are described, wherein the imaginary signal includes only amplitude information and no frequency modulation with a 90-degree phase shift.

Various embodiments are described, wherein the imaginary signal is $$\frac{(1+\cos(wt))}{2}\exp\left(\frac{i\pi}{2}\right).$$

The method of claim 9, wherein the compensation parameter is calculated as:

$$\frac{\hat{v}}{\hat{\mu}^*} = \frac{y'_1 - y'_2}{(y'_1 + y'_2)^*},$$

where $$\frac{\hat{v}}{\hat{\mu}^*}$$

is the compensation parameter, $y'_1$ is the first received signal, $y'_2$ is the second received signal.

Various embodiments are described, wherein compensating a third received signal based upon the compensation parameter includes calculating:

$$\hat{y} = y' - \left(\frac{\hat{v}}{\hat{\mu}^*}\right)y'^*,$$

where $\hat{y}$ is a compensated third signal and $y'$ is the received third signal.

BRIEF DESCRIPTION OF THE DRAWINGS

In order to better understand various exemplary embodiments, reference is made to the accompanying drawings, wherein.

DETAILED DESCRIPTION OF EMBODIMENTS

Figure 1:
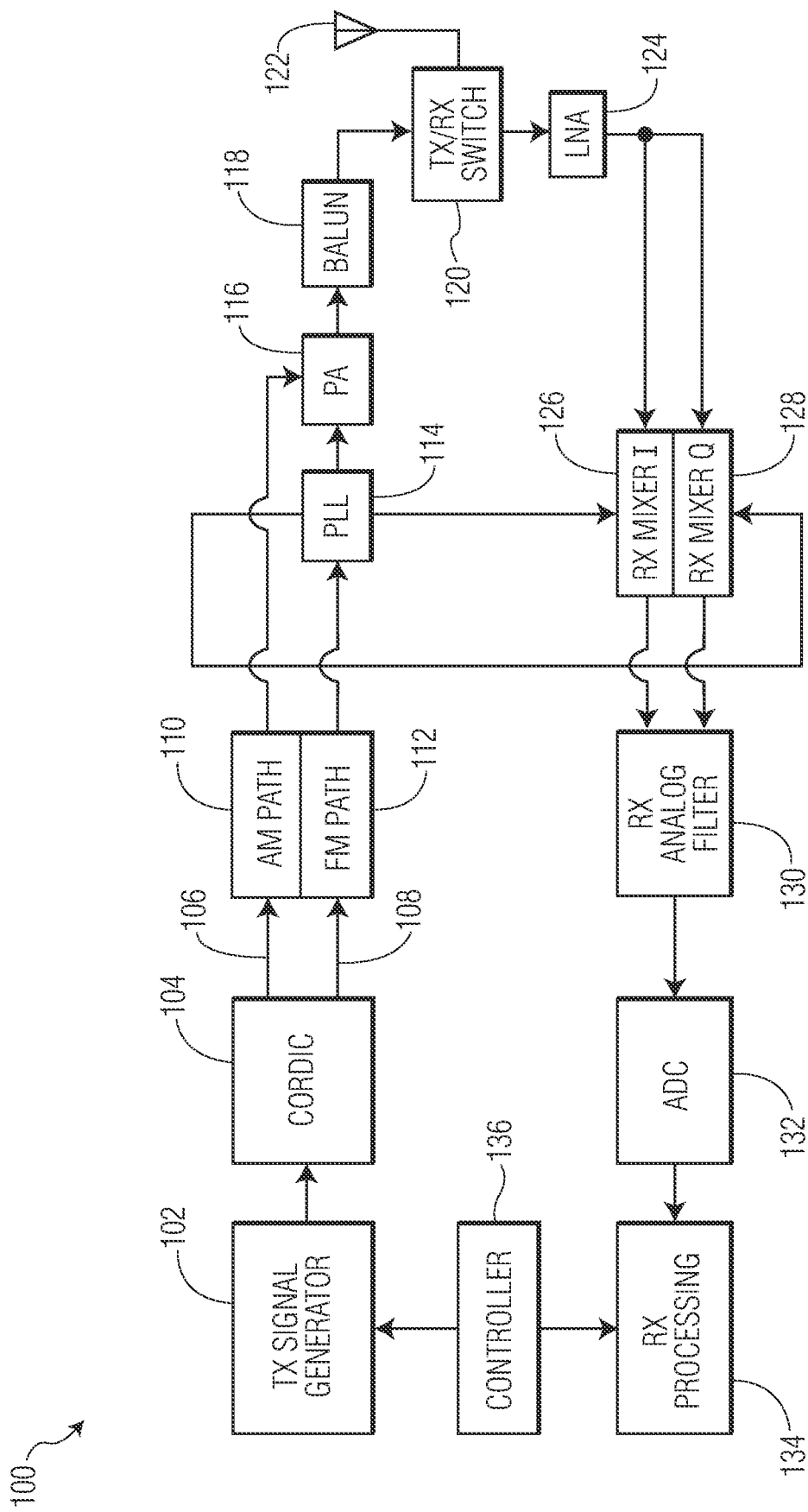
FIG. 1 illustrates the architecture of a polar transmitter/IQ receiver.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

A polar transmit architecture uses direct frequency modulation within a phased lock loop (PLL) and is also called direct injection. Thus, the PLL digitally controlled oscillator (DCO) clock is phase modulated during transmit (Tx) operation. For receive operation, unmodulated DCO derived clocks are used for the receive (Rx) mixer (i.e., down-conversion) operation. Loopback operation (simultaneous Tx/Rx) is not normally possible in this scenario as any modulation information in the clock phase shows up at the DC at the Rx due to self-mixing. Rx-IQ calibration in a polar Tx based transceiver is normally done using external instruments as signal generators. If a loopback-based Rx-IQ calibration is mandatory, an extra signal generator is required at the transmit side so that the PLL with a clean unmodulated clock can be used for Rx-mixer operation. The use of external instruments-based IQ calibration or an extra Tx signal generator add to the cost of the radio. Embodiments of a polar transmitter calibration method will be described herein that uses the existing available polar-Tx, IQ-Rx, and PLL blocks to perform loopback-based Rx-IQ calibration for significant cost savings.

The embodiments of the polar Tx Rx-IQ calibration method include the following features. Only AM modulation is applied through a polar transmit power amplifier (PA) using the amplitude modulated (AM) signal (a+b. cos(wt)) where a and b are selected to ensure that there is no phase transition in the PLL, i.e., constant FM signal is presented to the PLL. The PLL DCO clock is unmodulated and may be used to drive the Rx-mixer signal. An AM loopback signal is down-converted to baseband by the Rx-mixer. A first signal is transmitted with a fixed FM (no modulation) and the Rx-IQ calibration method (described later herein) uses this output to calculate the compensation parameter to correct the received signal. A second signal is transmitted with FM (i.e., DPLL input) with 90-degree phase with respect to the first signal. This output is also used to determine the compensation parameter. Rx-IQ calibration method then uses the received output to produce the compensation parameter that reflects an estimate the IQ imbalance. This compensation parameter is then used to correct for IQ imbalance in the normal mode of operation of receiver when it is receiving signal transmitted by any other link partner.

FIG. 1 illustrates the architecture of a polar transmitter/IQ receiver (Tx/Rx). The polar Tx/Rx 100 includes a transmitter that includes Tx signal generator 102, a cordic 104, an AM signal path 110, a FM signal path 112, a PLL 114, a PA 116, and a balun 118. The transmitter is connected to a Tx/Rx switch 120 that is connected to the antenna 122. The Tx/Rx switch 120 switches the connection of the antenna between the transmitter and a receiver during operation of the polar Tx/Rx 100. The polar Tx/Rx 100 also includes receiver that includes a low noise amplifier (LNA) 124, a Rx mixer 1126, a Rx mixer Q 128, a Rx analog filter 130, an ADC 132, and Rx processing 134. The polar Tx/Rx 100 also includes a controller 136 that controls the operation of the polar Tx/Rx 100 including controlling the Rx-IQ calibration method. The operation of the controller 136 will be described in great detail below.

The Tx signal generator 102 generates a transmit signal that may be represented by a complex vector. The cordic 104 receives the transmit signal and generates an amplitude signal 106 and a phase signal 108. Accordingly, the transmit signal is represented by an amplitude and phase instead of I and Q. The amplitude signal 106 enters the AM signal path 110 and is applied to the PA 116. The amplitude signal 106 modulates the gain of the PA 116 to affect an amplitude modulation of the signal input into the PA 116. The phase signal 108 is used to control the PLL 114 via the FM signal path 112.

The PLL 114 produces a constant amplitude signal with a varying frequency based upon the phase of the transmit signal. The output of the PLL 114 is then the input signal to the PA 116. The output of the PA 116 is filtered by a balun 118. The Tx/Rx switch 120 receives the output of the balun 118 and connects it to the antenna 122 so that the polar modulated transmit signal may be transmitted.

When the polar Tx/Rx 100 is in receive mode, the Tx/Rx switch 120 connects the antenna 122 to the LNA 124. The LNA 124 amplifies the received signal and produces an in-phase I signal and quadrature signal Q. The Rx mixer I 126 mixes the I signal down to baseband, and the Rx mixer Q 128 mixes the Q signal down to baseband. The signal used to mix the I and Q signals from the LNA 124 are derived from clocks produced by a voltage-controlled oscillator (VCO) in the PLL 114. The outputs of the Rx mixer 1126 and the Rx mixer Q 128 may then be filtered using for example a Rx analog filter 130. The ADC 132 then converts the filtered I and Q signals from the Rx analog filter 130 to produce a receive digital signal. The Rx processing 134 processes the received digital signal to recover the data or other information conveyed by the received signal.

The PLL 114 produces the various clock and timing signals needed by the polar Tx/Rx 100. The PLL 114 produces the Tx_lo_clk (VCO/2) that is FM modulated based upon the phase signal 108 and then input into the PA 116 to be amplitude modulated by the amplitude signal 106. A Rx_clk_i signal is derived from the VCO/2 using the even rising edges of the VCO and has a 50% duty cycle. The Rx_clk_i signal is used by the Rx mixer 1126 to mix the I signal output by the LNA 124. A Rx_clk_q is derived from the VCO/2 using the odd rising edges of the VCO and has a 50% duty cycle. The Rx_clk_q is used by the Rx mixer Q 128 to mix the Q signal output by the LNA 124. In order to calibrate the polar Tx/Rx 100, the transmit signal may be looped back at the Tx-Rx switch with attenuation to the input of the LNA 124. This calibration mode of operation is controlled by the controller 136. The calibration mode may be run once after manufacture, run once after startup, or run periodically during the operation of the polar Tx/Rx 100. If the calibration mode is run during operation, it may be run when the polar Tx/Rx 100 is idle. Further, the calibration mode may be run based upon a fixed schedule. Alternatively, a sensor may be used to monitor changes in the polar Tx/Rx 100, and based upon changes in the sensor output, the calibration may be run. An example of such a sensor is a temperature sensor. Because the operating characteristics of the polar Tx/Rx 100 may vary over temperature which might affect the IQ balance of the receiver, when the temperatures changes by a threshold amount, the controller 136 may schedule the calibration mode to update the calibration parameters of the receiver. A method for calibrating the polar Tx/Rx 100 will now be described.

The Rx_clk_i and Rx_clk_q signals may have a phase error θ compared to an ideal 90-degree offset. Further, the Rx mixer I 126 and Rx mixer Q 128 local oscillator clock inputs may also have an amplitude mismatch a. The IQ imbalance may be modeled as y'=µ.y+v.y*, where '*' is the conjugate operation, y, y and v are complex, y is the input to the receiver, y' is the output of the Rx mixer 1126 and Rx mixer Q 128. It is noted that both y and y' are equivalent baseband models. Further µ is $$\cos\left(\frac{\phi}{2}\right) + j\alpha\sin\left(\frac{\phi}{2}\right)$$

and v is $$\alpha\cos\left(\frac{\phi}{2}\right) - j\sin\left(\frac{\phi}{2}\right).$$

for no IQ imbalance α and φ are 0. At the receiver, time domain IQ imbalance correction may be performed as:

$$\hat{y} = y' - \left(\frac{\hat{v}}{\hat{\mu}^*}\right)y'^*,$$

where $\hat{v}$ and $\hat{\mu}$ are estimates of v and µ and $\hat{y}$ is the IQ compensated received signal.

Therefore, the ratio $$\left(\frac{\hat{v}}{\hat{\mu}^*}\right)$$

is sufficient for IQ imbalance compensation.

The estimation of this compensation parameter $$\left(\frac{\hat{v}}{\hat{\mu}^*}\right)$$

will be described. First, a real signal y=$b_i$+j0 is transmitted. The resulting receive signal then becomes $y_1$'=h(µ. $b_i$+v. $b_i$)=h$b_i$(µ+v), where h is the loopback channel response. Next, an imaginary signal y=0+j$b_q$ is transmitted. The resulting receive signal then becomes $y_2$'=h(µ. $b_q$-v. $b_q$)=h$b_q$ (µ-v), where h is the loopback channel response. If it is assumed that $b_i$=$b_q$, then $$\frac{y'_1}{y'_2} = \frac{\mu+v}{\mu-v},$$

which may be rewritten as $$\frac{\hat{\mu}}{\hat{\mu}^*} = \frac{y'_1 + y'_2}{y'_1 - y'_2},$$

which may be modified to:

$$\frac{\hat{v}}{\hat{\mu}^*} = \frac{y'_1 - y'_2}{(y'_1 + y'_2)^*}.$$

This equation illustrates how the two received signals may be used to estimate the compensation parameter $$\frac{\hat{v}}{\hat{\mu}^*}.$$

A loopback-based estimation of the compensation parameter $$\frac{\hat{v}}{\hat{\mu}^*}$$

may be carried out as follows. First, the controller 136 has the Tx signal generator 102 transmits $$b_1(t) = \frac{(1 + \cos(wt))}{2}$$

where $w=2\pi\beta_1$; $\beta_1$<Rx_LPF cut-off frequency. This signal includes AM information only and the PLL 114 does not provide any frequency modulation, so $b_1(t)$ is a real signal. The Tx_lo_clk, Rx_clk_i and Rx_clk_q signals are unmodulated clocks that are used to mix the received loopback signal to produce loopback receive signal is $c_1(t)$. Next, the controller 136 has the Tx signal generator 102 transmit $$b_2(t) = \frac{(1 + \cos(wt))}{2}\exp\left(\frac{i\pi}{2}\right)$$

where a 90-deg constant phase shift is applied by the PLL 114. This signal includes AM information only and the PLL 114 does not have any FM modulation except that the transmit phase is 90-deg rotated. Again, the Tx_lo_clk, Rx_clk_i and Rx_clk_q signals are used to mix the received loopback signal to produce the loopback receive signal $c_2(t)$. Now $y_1'=\text{Re}(c_1)+j.\text{Im}(c_1)$ and $y_2'=\text{Re}(c_2)+j.\text{Im}(c_2)$ which may be used to estimate $$\frac{\hat{v}}{\hat{\mu}^*}.$$

The projections may computed as rms (Re($c_1(t)$)), i.e., the root-mean-square (RMS) value of real and imaginary parts of the Rx signal. The $y_1'$ and $y_2'$ may now be used to calculate the compensation parameter using the equation:

$$\frac{\hat{v}}{\hat{\mu}^*} = \frac{y_1' - y_2'}{(y_1' + y_2')}.$$

The Rx processing 134 may then use the compensation parameter to then compensate the received signal using the equation:

$$\hat{y} = y' - \left(\frac{\hat{v}}{\hat{\mu}^*}\right)y'^*.$$

Figure 2:
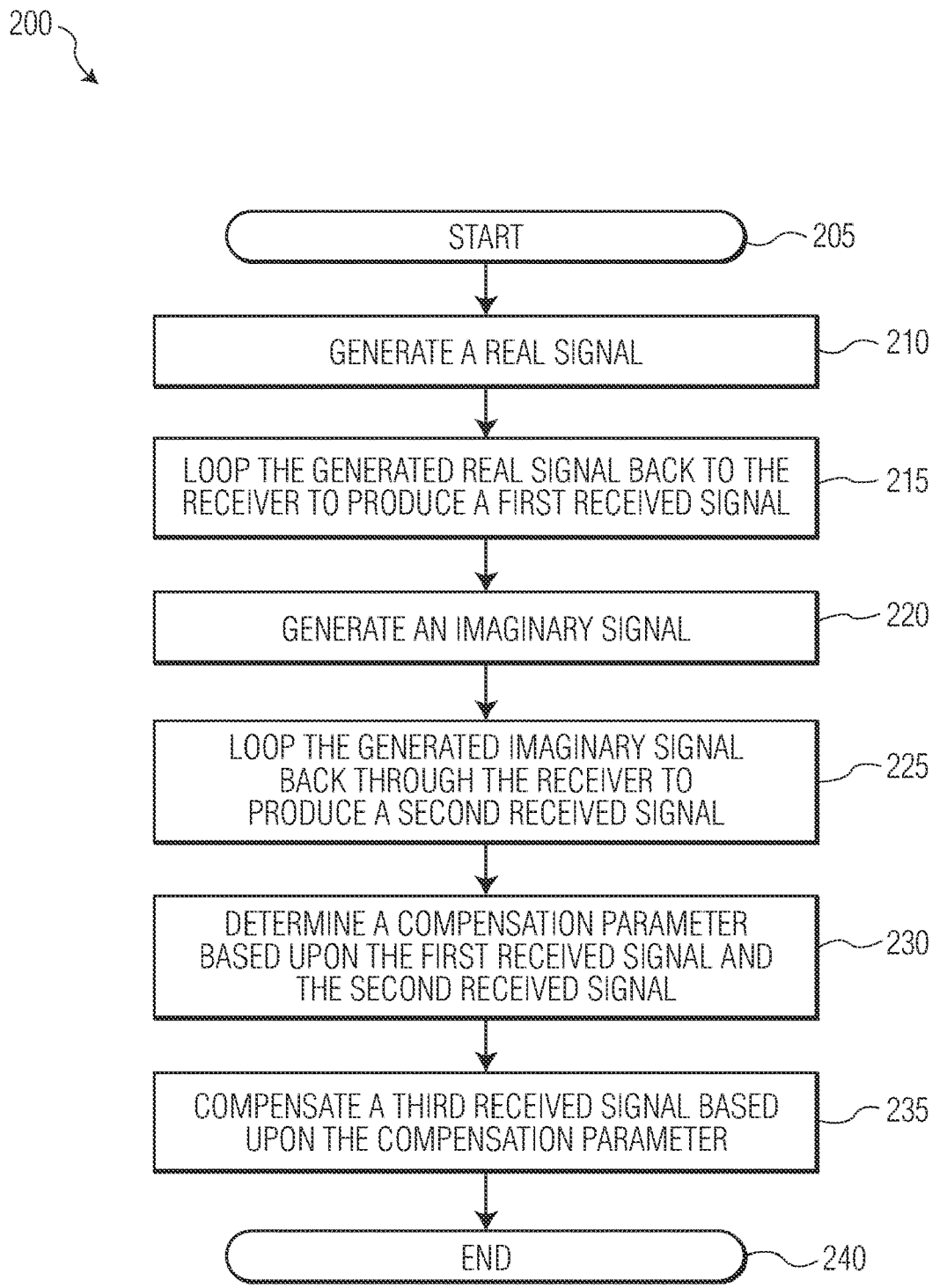
FIG. 2 illustrates a flow diagram of an IQ calibration method To facilitate understanding, identical reference numerals have been used to designate elements having substantially the same or similar structure and/or substantially the same or similar function.

FIG. 2 illustrates a flow diagram of an IQ calibration method. The IQ calibration method 200 starts at 205. Then the IQ calibration method 200 generates a real signal 210. This is a signal with just a real component without any phase shift. Examples of such a signal are described above. The generated real signal is looped back to the receiver via the Tx/Rx switch 120 to produce a first received signal 215. The looped back real signal will be processed by the Rx mixer I 126, Rx mixer Q 128, Rx analog filter 130, ADC 132, and the Rx processing 134. Next, the IQ calibration method 200 generates an imaginary signal 220. The generated imaginary signal is looped back to the receiver via the Tx/Rx switch 120 to produce a second received signal 225. The looped back imaginary signal will be processed by the Rx mixer I 126, Rx mixer Q 128, Rx analog filter 130, ADC 132, and the Rx processing 134. Then the IQ calibration method 200 determines a compensation parameter based upon the first received signal and the second received signal 230. This may be calculated using the equation described above. The IQ calibration method 200 next compensates a third received signal based upon the compensation parameter 235. Finally, IQ calibration method 200 ends at 240.

The IQ calibration method 200 may be carried out by the polar Tx/Rx 100. Specifically, the controller 136 may control the polar Tx/Rx 100 to carry out the steps of the IQ calibration method 200. This may be done once during the life of the IQ calibration method 200, at startup of the IQ calibration method 200, periodically, or based upon a sensor, such as a temperature sensor, or some combination of these approaches.

The controller 136 may be implemented in different ways. One approach is as an integrated circuit that includes logic circuits to carry out the various control steps of the IQ calibration method 200. In another approach, the controller may include a programable processor. The processor may include a microprocessor, microcontroller, graphics processing unit (GPU), neural network processor, field programmable gate array (FPGA), application-specific integrated circuit (ASIC), or other similar devices.

A storage or memory associated with the processor may include program steps that define the various control steps of the IQ calibration method 200. Further, the controller 136 may have a communication interface that allows for user input, receiving system control commands, receiving parameter configuration, receiving sensor information, etc.

The polar Tx/Rx 100 and IQ calibration method 200 described herein allows for the compensation of IQ imbalance and other variations in the polar Tx/Rx 100. Two signals are generated by the Tx signal generator 102 and fed back to the receiver by the Tx/Rx switch 120. These two received signals may then be used to generate a single compensation parameter that may be used to compensate for errors in the polar Tx/Rx 100 such as receiver IQ imbalance.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A transmit and receive system using polar modulation, comprising:
    a transmitter configured to produce a transmit signal using modulation;
    a receiver configured to receive a transmit signal using in-phase/quadrature (IQ) processing;

a Tx/Rx switch configured to loop a transmitted signal from the transmitter back to the receiver for calibration; and a controller configured to:
  command the transmitter to generate a real signal;
  command the Tx/Rx switch to loop the real signal back to the receiver to produce a first received signal;
  command the transmitter to generate an imaginary signal;
  command the Tx/Rx switch to loop the imaginary signal back to the receiver to produce a second received signal;
  determine a compensation parameter to compensate for IQ imbalance in the receiver based on the first received signal and the second received signal; and
  command the receiver to compensate a third received signal based upon the compensation parameter, wherein the compensation parameter is calculated as:

$$\frac{\hat{v}}{\hat{\mu}^*} = \frac{y'_1 - y'_2}{(y'_1 + y'_2)^*},$$

where $$\frac{\hat{v}}{\hat{\mu}^*}$$

is the compensation parameter, $y_1'$ is the first received signal, $y_2'$ is the second received signal.

2. The transmit and receive system of claim 1, wherein a phased-locked-loop (PLL) in the receiver produces an unmodulated I clock signal and unmodulated Q clock signal used by a Rx mixer I and Rx mixer Q in the receiver.

3. The transmit and receive system of claim 2, wherein the real signal includes only amplitude information and no frequency modulation.

4. The transmit and receive system of claim 3, wherein the real signal is $$\frac{(1 + \cos(wt))}{2}$$

where $w = \pi f_1$ and $f_1$ is a transmit frequency.

5. The transmit and receive system of claim 3, wherein the imaginary signal includes only amplitude information and no frequency modulation with a 90-degree phase shift.

6. The transmit and receive system of claim 5, wherein the imaginary signal is $$\frac{(1 + \cos(wt))}{2} \exp\left(\frac{i\pi}{2}\right).$$

7. The transmit and receive system of claim 1, wherein compensating a third received signal based upon the compensation parameter includes calculating:

$$\hat{y} = y' - \left(\frac{\hat{v}}{\hat{\mu}^*}\right) y'^*,$$

where $\hat{y}$ is a compensated third signal and $y'$ is the received third signal.

8. A method of calibrating a transmit and receive system using polar modulation, comprising:
  generating a real signal;
  looping back the real signal back to a receiver to produce a first received signal;
  generating an imaginary signal;
  looping back the imaginary signal back to the receiver to produce a second received signal;
  determining a compensation parameter to compensate for IQ imbalance in the receiver based on the first received signal and the second received signal; and
  compensating a third received signal based upon the compensation parameter, wherein the compensation parameter is calculated as:

$$\frac{\hat{v}}{\hat{\mu}^*} = \frac{y'_1 - y'_2}{(y'_1 + y'_2)},$$

where $$\frac{\hat{v}}{\hat{\mu}^*}$$

is the compensation parameter, $y_1'$ is the first received signal, $y_2'$ is the second received signal.

9. The method of claim 8, further comprising:
  producing an unmodulated in-phase (I) clock signal and unmodulated quadrature (Q) clock signal; and
  mixing the first received signal to baseband using an Rx mixer I and an Rx mixer Q in the receiver.

10. The method of claim 8, wherein the real signal includes only amplitude information and no frequency modulation.

11. The method of claim 10, wherein the real signal is $$\frac{(1 + \cos(wt))}{2}$$

where $w = 2\pi f_1$ and $f_1$ is a transmit frequency.

12. The method of claim 11, wherein the imaginary signal includes only amplitude information and no frequency modulation with a 90-degree phase shift.

13. The method of claim 12, wherein the imaginary signal is $$\frac{(1 + \cos(wt))}{2} \exp\left(\frac{i\pi}{2}\right).$$

14. The method of claim 8, wherein compensating a third received signal based upon the compensation parameter includes calculating:

$$\hat{y} = y' - \left(\frac{\hat{v}}{\hat{\mu}^*}\right) y'^*,$$

where $\hat{y}$ is a compensated third signal and $y'$ is the received third signal.

* * * * *